United States Patent

Rossteuscher

[11] Patent Number: 5,948,980
[45] Date of Patent: Sep. 7, 1999

[54] METHOD AND ARRANGEMENT FOR CLAMPING A MOTOR VEHICLE WHEEL ON A BALANCING MACHINE SHAFT

[75] Inventor: Gerhard Rossteuscher, Belleville, Canada

[73] Assignee: Hofmann Werkstatt-Technik GmbH, Germany

[21] Appl. No.: 09/049,050

[22] Filed: Mar. 27, 1998

[30] Foreign Application Priority Data

Mar. 27, 1997 [DE] Germany .............................. 197 13 075

[51] Int. Cl.⁶ ..................................................... G01M 1/02
[52] U.S. Cl. .............................................................. 73/487
[58] Field of Search ............................ 73/487, 460, 462; 301/5.21, 5.22

[56] References Cited

U.S. PATENT DOCUMENTS 4,332,169  6/1982  Stuart ........................................ 73/487
5,615,574  4/1997  Drechsler et al. ........................ 73/487

*Primary Examiner*—John E. Chapman
*Attorney, Agent, or Firm*—Pillsbury, Madison & Sutro LLP

[57] ABSTRACT

A method and an arrangement for releasably clamping a motor vehicle wheel to a shaft of a balancing machine, in which when clamping the wheel on the shaft a clamping nut is held fast and the shaft is driven in rotation by the drive motor of the machine. The nut is thereby tightened on the main shaft to clamp the wheel in position thereon. The nut can be released by reversing the procedure.

11 Claims, 1 Drawing Sheet

METHOD AND ARRANGEMENT FOR CLAMPING A MOTOR VEHICLE WHEEL ON A BALANCING MACHINE SHAFT

FIELD OF THE INVENTION

The invention concerns a method and arrangement for clamping a motor vehicle wheel fast on a main shaft of a wheel balancing machine.

BACKGROUND OF THE INVENTION

Motor vehicle wheels can be releasably fixed on the main shaft of a motor-driven wheel balancing machine for carrying out a wheel balancing operation, by the use of centering and clamping means. Reference may be made in this respect to the company prospectus from Hofmann Werkstatt-Technik GmbH, Pfungstadt, Germany, 'Zentrier- und Spannmittel' ['Centering and clamping means'], imprint 9402192 02.96. When dealing with wheels which are centered at a central hole therein, the wheel is clamped in position on the balancing machine shaft by means of a central centering arrangement. In that situation, the centering effect is afforded by way of one or more centering cone portions, cone rings or special centering rings. When dealing with wheels which are centered at the bolt or stud holes on the other hand, centering bolts or pins of a conical configuration are pressed into the bolt or stud holes in the motor vehicle wheel so that the co-operation between the centering pins and the holes in the wheel produces the centering and clamping effect. A centering action can also be effected by way of the central hole in the motor vehicle wheel, in combination with centering at the bolt or stud holes. The wheel is clamped fast in position on the shaft of the wheel balancing machine by means of a clamping or pressure nut which is in screwthreaded engagement with the shaft of the machine. The nut can be in the form of a butterfly-type nut or can be in the general shape of a hand wheel or may be of some other similar hand-operable configuration so that the nut can be rotated with respect to the stationary shaft by manual rotation, whereby the resulting axial movement of the nut in relation to the shaft causes the centering cone configurations to come into action to provide for central hole centering and/or stud hole centering. To release the wheel the nut is rotated by hand in the opposite direction.

DE 42 00 380 C2 discloses effecting central hole centering of a motor vehicle wheel on the main shaft of a wheel balancing machine by means of a nut which is driven by the motor of the machine, being mounted rotatably on the main shaft, and by way of a pull bar which is passed through the main shaft and with which the nut is in screwthreaded engagement.

SUMMARY OF THE INVENTION

An object of the present invention is to provide a method of releasably fixing a motor vehicle wheel on a wheel balancing machine shaft, with which centered clamping of the wheel on the shaft is made easier from the point of view of the operator without involving a high level of additional expenditure.

Still another object of the present invention is to provide a method of releasably clamping a motor vehicle wheel on a shaft of a wheel balancing machine, which involves a simple operating procedure that also affords the possibility of automated operation.

Yet another object of the present invention is to provide an arrangement for releasably fixing a motor vehicle wheel on a main shaft of a wheel balancing machine, which can be of a simple and robust structure while nonetheless ensuring a high level of operational reliability.

In accordance with the principles of the present invention, in the method aspect, the foregoing and other objects are attained by a method of releasably fixing a motor vehicle wheel on a main shaft of a wheel balancing machine, in which a central hole of the wheel and/or stud or bolt holes provided on the wheel are clamped on to one or more centering cones or taper means arranged in defined relationship with respect to the axis of the main shaft, by means of a clamping or pressure nut displaceable on the main shaft in the axial direction thereof by screwthreaded engagement. To provide for axial displacement of the nut the shaft is rotated by the motor drive of the machine while the nut is held fast to prevent rotation thereof.

Further in accordance with the invention, in the arrangement aspect, the foregoing and other objects are attained by an arrangement for releasably fixing a motor vehicle wheel on a main shaft of a wheel balancing machine which is drivable by a drive motor, comprising one or more centering cones or taper members arranged in defined relationship with respect to the axis of the shaft, and a clamping or pressure nut which is movable in the axial direction of the shaft by screwthreaded engagement therewith. A central hole in the wheel and/or stud or bolt holes in the wheel are clamped on to the centering cone or cones. The nut can be held fast to prevent it from rotating, and the drive motor of the shaft can be switched on for axial displacement of the nut which is held fast while the shaft rotates.

It will be noted that the nut can also be released in the same fashion.

As will be seen in greater detail from preferred embodiments of the invention as described hereinafter, the main shaft of the machine is driven by its motor drive and the nut is held fast to prevent it from rotating, thereby implementing axial displacement of the nut in relation to the shaft. The force required for clamping the wheel on the shaft is therefore furnished by the motor drive which subsequently also serves to drive the main shaft for an unbalance measuring run. The nut can be in the form of a butterfly-type nut or can be of a configuration resembling a hand wheel. The nut can be held fast by hand by the operator, although it is also possible to use a holding assembly which is supported on the frame structure of the machine, to hold the nut fast to prevent it from rotating.

In a preferred feature of the invention, in the operation of clamping the motor vehicle wheel fast on the wheel balancing machine shaft by means of the motor drive, the torque generated by the motor drive is monitored and the motor drive is switched off when that torque reaches a given value. That torque value ensures that the motor vehicle wheel is sufficiently firmly braced on the shaft for implementation of the unbalance measuring run to ascertain unbalance of the wheel. To release the motor vehicle wheel, the nut is once again held fast to prevent it from rotating and the main shaft is then driven in the opposite direction by the motor drive. In that situation the motor drive is switched off when the detected torque has fallen to a given value. That ensures that the nut can be readily released from the main shaft in order thereby to release the wheel.

Further objects, features and advantages of the invention will be apparent from the following description of preferred embodiments of the invention.

DESCRIPTION OF THE PREFERRED EMBODIMENTS

Figure 1:
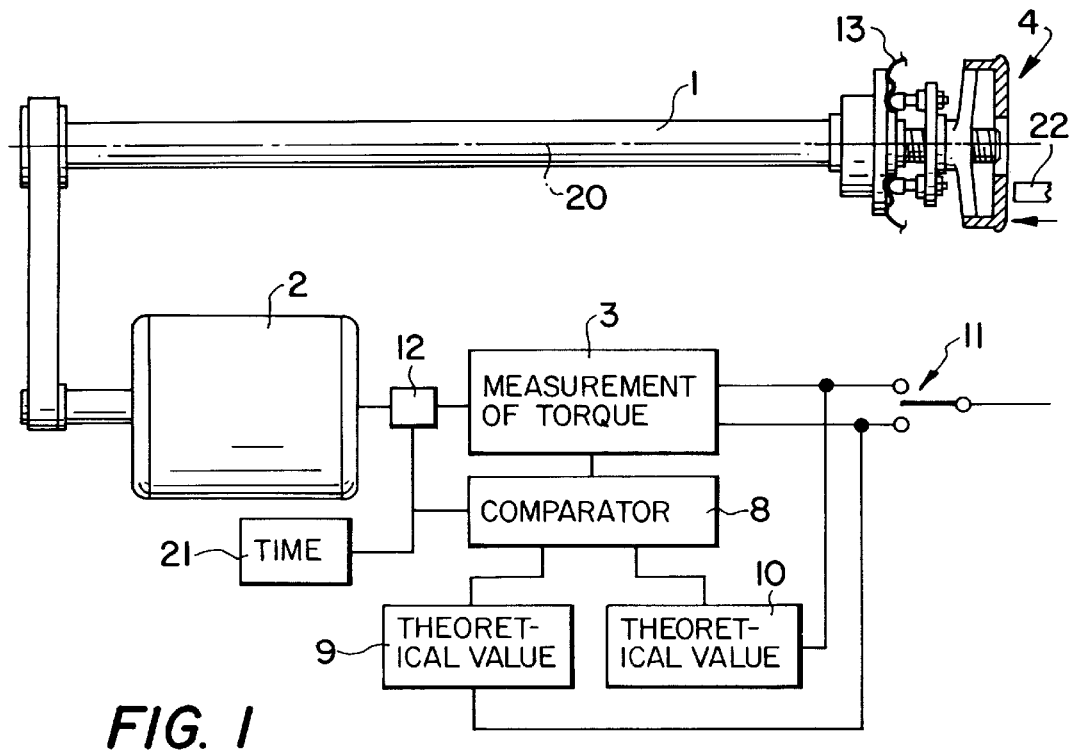
FIG. 1 is a diagrammatic view of a main shaft of a balancing machine which is driven by a drive motor and a block circuit diagram showing a control device for switching the drive motor on and off when tightening and releasing the centering and clamping arrangement.

Referring firstly to FIG. 1, reference numeral 1 therein denotes a main shaft of a wheel balancing machine for ascertaining unbalance of a motor vehicle wheel. For that purpose a motor vehicle wheel of which part is diagrammatically indicated at 13 is clamped in position on the main shaft 1 at the forward end thereof, which is towards the right in FIG. 1, by the action of centering and clamping means constituting a clamping assembly as indicated generally at 4. The main shaft 1 with the motor vehicle wheel 13 clamped thereon is driven in the unbalance measuring run by a drive motor 2 which is shown in the form of an electric motor and which is in particular a capacitor motor, as disclosed in EP 0 524 465 B1 to which reference is accordingly directed, or any other suitable ac motor which can also be used as a counter-current brake.

The drive motor 2 is also used to supply the force or torque with which the motor vehicle wheel 13 can be fixed in position on the main shaft and released again from the clamped position after the unbalance measuring operation and the balancing procedure have been carried into effect. Further reference to this will be set out hereinafter.

It will be noted that the clamping assembly 4 can be of any suitable configuration. Possible embodiments are shown in the views in FIGS. 2(A), (B) and (C).

Figure 2A:
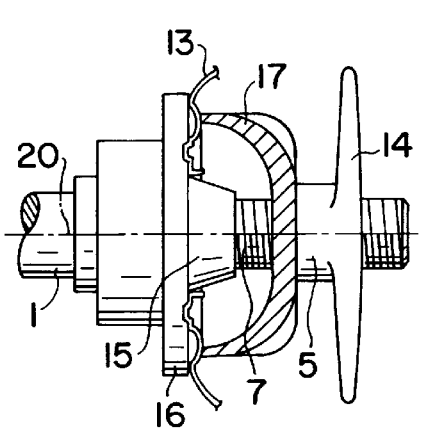
FIGS. 2(A)–(C) show various embodiments of centering and clamping means.
Figure 2B:
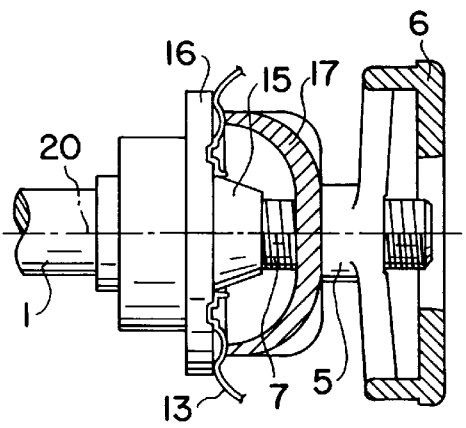

In the embodiments shown in FIG. 2(A) and FIG. 2(B), the arrangement involves central hole centering of the motor vehicle wheel 13 by means of a centering cone 15 which is fitted on to the main shaft 1. When the wheel 13 is fixedly clamped on to the main shaft 1, the central hole in the motor vehicle wheel 13 is pushed on to the centering cone 15. The wheel 13 is pressed against a flange 16 carried on the main shaft 1 by means of a clamping nut 5. In the embodiment shown in FIG. 2(A) the clamping nut 5 has a butterfly-type gripping assembly 14 formed thereon, while in the embodiment shown in FIG. 2(B) the nut 5 has a configuration in the general form of a hand wheel as indicated at 6 formed thereon. The nut 5 is in screwthreaded engagement with a screwthreaded portion 7 which is non-rotatably connected to the shaft 1. A generally bowl-shaped pressure member 17 can be provided between the nut 5 and the motor vehicle wheel 13, to transmit and carry the wheel clamping force.

Figure 2C:
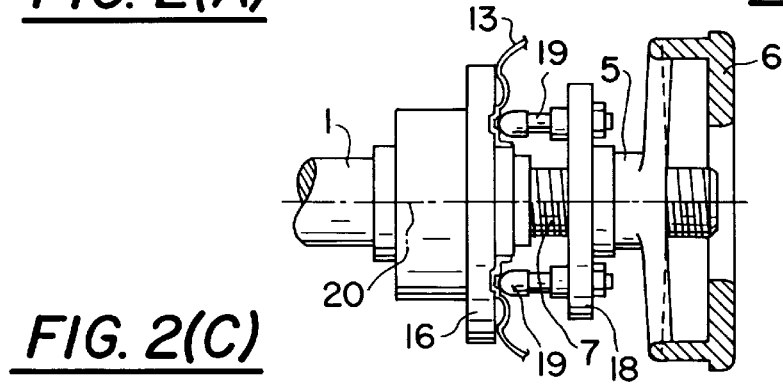

In the embodiment shown in FIG. 2(C), an interchangeable flange 18 with centering pins or studs 19 is interposed between the nut 5 and the motor vehicle wheel 13. The centering pins or studs 19 have conically shaped front ends which engage into the stud or bolt holes in the motor vehicle wheel 13. The centering pins or studs 19 can be interchanged or disposed at different radii on the flange 18, in generally known manner.

The invention provides that, when the wheel 13 is to be clamped on the main shaft 1 of the wheel balancing machine, the main shaft 1 and the screwthreaded portion 7 which is non-rotatably connected thereto are rotated while the nut 5 is held fast to prevent it from rotating, for example by gripping the butterfly portion 14 or the hand wheel portion 6 respectively. The nut 5 can be held fast by hand or it can be held by means of a holding device which is diagrammatically indicated generally at 22 in FIG. 1. The holding device 22 is supported on a suitable part of the frame structure (not shown) of the balancing machine and can be brought into engagement with the clamping assembly 4. By virtue of the rotational movement of the main shaft 1 with screwthreaded portion 7 thereon, the nut 5 which is held fast to prevent it from rotating is displaced towards the left in the views shown in FIG. 2 when the wheel 13 is to be clamped fast on the shaft 1, whereby the wheel 13 is pressed firmly against the respective flange 16. The motor vehicle wheel 13 is centered with respect to the axis 20 of the shaft 1, by virtue of the action of the centering cone 15 or the centering pins or studs 19.

The main shaft 1 is driven in rotation by the drive motor 2 which is switched on by means of a main switch as indicated at 11 in FIG. 1, or another switch which is actuated for example by means of a pedal. The main switch or the pedal-actuated switch can be in the form of a tumbler switch so that the drive motor 2 and therewith the main shaft 1 can be driven in both directions of rotation in order thereby to clamp the wheel 13 on the main shaft 1 and to release the wheel 13 respectively. For the clamping procedure the drive motor 2 is driven in such a way that the nut 5 is moved towards the left in FIG. 2 by virtue of rotation of the shaft 1 and the screwthreaded portion 7, as already referred to above. During the clamping procedure, the current drawn by the motor 1 is measured for torque measurement purposes. For that purpose the arrangement has a suitable torque measuring device indicated generally at 3 which can be in the form of a measuring device for measuring the motor supply current. A comparator 8 is connected to the torque measuring device 3. A torque reference value generator or sender, for example in the form of a storage means, is also connected to the comparator 8, as indicated at 9 and 10. The reference value storage means 9 stores the torque value which is not to be exceeded in the procedure for clamping the wheel 13 on the main shaft 1. As soon as that value is reached, the comparator 8 supplies a signal to a switch 12 which switches off the feed of current to the drive motor 2. The torque reference value stored in the storage means 9 is of such a magnitude that the motor vehicle wheel 13 is clamped with a sufficient clamping force on the main shaft 1 by means of the clamping assemblies shown in FIG. 2. The reference value storage means 9 is activated when the drive motor 2 is switched on, to rotate in the direction of rotation intended for clamping the wheel 13 on the main shaft 1.

When releasing the clamping assembly 4, the main switch 11 or the pedal-actuated switch or tumbler switch is actuated in the other direction so that the main shaft 1 is then driven in the reverse direction. The nut 5 is again held fast to prevent it from rotating. At the same time a reference value storage device 10 is activated, which stores a reference value in respect of torque at which the supply current is to be switched off when releasing the clamped wheel 13, by operation of the drive motor 2. As soon as the torque has fallen to that reference value in the wheel-release procedure, the comparator 8 again supplies the corresponding switch-off signal to the switch 12. The nut 5 is then released to such a degree that it can be easily removed from the screwthreaded portion 7 by hand by the operator by rotation of the nut 5 by hand, for definitive removal of the motor vehicle wheel 13 from the machine.

It is also possible to provide a safety device which switches off the motor 2 when the clamping assembly 4 is not held fast. For that purpose the arrangement may have a timer as indicated generally at 21 which presets a given period of time that begins when the drive motor 2 is switched on. That period of time corresponds at least to the period of time which is required for the wheel 13 which is to be balanced to be clamped fast on the main shaft 1 with the required reference torque, while the clamping assembly 4 is held fast. When the period of time which is preset by the timer 21 has expired and the reference torque has not been reached, a signal is produced, for example by the timer 21, for switching off the drive motor 2. For that purpose the timer 21 can be connected to the switch 12. This switch-off effect which is implemented by the timer 21 occurs in the same way as the mode of operation involving the comparator 8. If the comparator 8 has not acted to switch off the arrangement within the predetermined period of time, then that switch-off action is effected by the timer 21 in the above-described manner.

In order to provide a safety aspect, it is also possible to monitor the speed of rotation of the main shaft 1. If the period of time involved at the ascertained speed of rotation of the main shaft 1 does not correspond to the rotational speed pattern which occurs in a normal regular wheel-clamping procedure, the drive motor 2 is also switched off after a given period of time has expired.

It will be seen therefore that the method and arrangement in accordance with the principles of the present invention can be used in relation to any suitable form of wheel balancing machine for rotating a motor vehicle wheel to provide for unbalance detection and subsequent balancing as required.

It will be appreciated that the above-described method and apparatus in accordance with the invention have been set forth solely by way of example and illustration of the principles thereof and that various other modifications and alterations may be made therein without thereby departing from the spirit and scope of the invention.

What is claimed is:

1. A method of releasably fixing a motor vehicle wheel on a shaft of a wheel balancing machine having a motor drive, wherein the wheel is clamped and centered in a defined relationship with respect to the axis of the shaft, by engagement of a nut displaceable on the shaft in the axial direction thereof by virtue of screwthreaded engagement with the shaft, and wherein for axial displacement of the nut the shaft is rotated by the motor drive and the nut is held fast to prevent rotation thereof.

2. A method as set forth in claim 1 wherein the motor vehicle wheel is released from the shaft by rotation of the shaft by the motor drive in the reverse direction from the direction of rotation for fixing the motor vehicle wheel on the shaft, while the nut is again held fast to prevent rotation thereof.

3. A method as set forth in claim 1, wherein the motor drive is switched off upon the attainment of a reference torque value produced by the motor drive against the nut which is held fast during the wheel-clamping operation, wherein the torque produced by the motor drive against the nut which is held fast is compared to a reference torque.

4. A method as set forth in claim 1 as claim 3 wherein the motor drive is switched off if, within a given period of time after the motor drive is switched on, the torque produced by the motor drive remains below a reference torque value.

5. An apparatus for releasably fixing a motor vehicle wheel on a shaft of a balancing machine having a drive motor for driving the shaft, comprising centering means arranged in defined relationship with respect to the axis of the shaft, a nut adapted to be carried on the shaft in screwthreaded engagement and movable thereon for selectively clamping the wheel on to the centering means, the nut having means whereby it can be held fast to prevent it from rotating, means for switching on the drive motor of the shaft to produce axial displacement of the nut on the shaft while the nut is held fast.

means for switching off the drive motor operable to rotate said shaft when a reference torque is reached, a reference value storage means for storing a reference torque value, a comparison means for comparing said reference torque value to torque produced by said drive motor against said nut when held fast, means for connecting said reference value storage means and said comparison means, and means for activating said reference value storage means when said drive motor is switched on.

6. An apparatus as set forth in claim 5 wherein the nut has means for holding it fast by hand.

7. An apparatus as set forth in claim 5 and further including a frame, and holding means adapted to be supported at the frame and operable to hold fast the nut.

8. An apparatus as set forth in claim 5 wherein for releasing said wheel said shaft is adapted to be driven by said drive motor in a direction of rotation opposite to that for tightening said nut, with said nut being held fast to prevent it from rotating.

9. An apparatus as set forth in claim 5 including a timing means for timing a period of time corresponding at least to the period of time within which the reference torque is achieved by the drive motor when the nut is held fast, and a means for producing a switch-off signal for switching off the drive motor after the expiry of said period of time predetermined by said timing means.

10. An apparatus as set forth in claim 5, wherein the centering means comprises a centering cone.

11. An apparatus as set forth in claim 5, wherein the centering means comprises a plurality of centering cone portions.

\* \* \* \* \*